J. B. FISCHER.
FISH BAIT.
APPLICATION FILED NOV. 8, 1907.
906,519.
Patented Dec. 15, 1908.
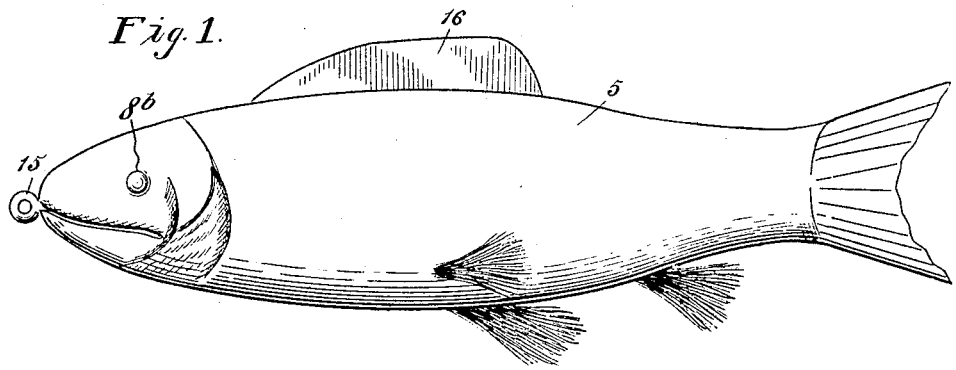
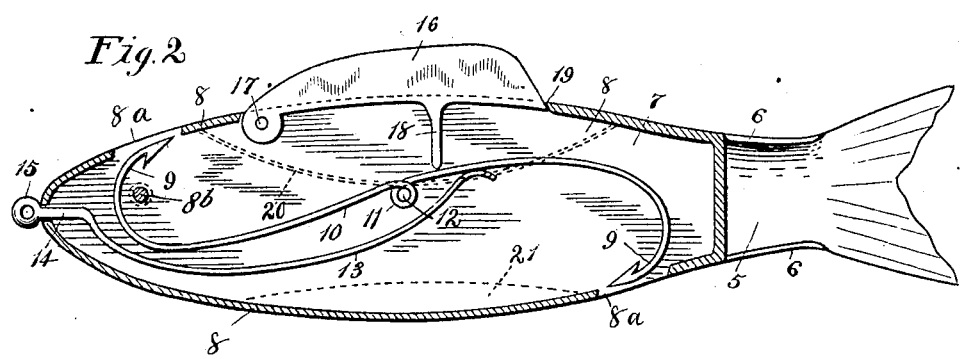
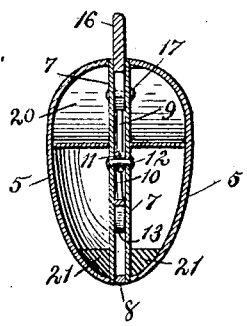
Witnesses:
C. F. Bassett
M. A. Milord
Inventor
Joseph B. Fischer
By Frederick Benjamin
Atty.

UNITED STATES PATENT OFFICE.

JOSEPH B. FISCHER, OF CHICAGO, ILLINOIS.

FISH-BAIT.

No. 906,519.　　　　Specification of Letters Patent.　　　Patented Dec. 15, 1908.

Application filed November 8, 1907. Serial No. 401,202.

*To all whom it may concern:*

Be it known that I, JOSEPH B. FISCHER, a citizen of the United States, residing at Chicago, in the county of Cook and State of Illinois, have invented certain new and useful Improvements in Fish-Bait, of which the following is a specification.

This invention relates to improvements in artificial bait for fish, and consists of a device preferably made to resemble a fish in shape and general appearance, in which one or more hooks are concealed until the bait is taken or "struck" by the fish, whereupon the hooks are projected by the action of the fish and engage the mouth of the latter.

While I have for the purposes of this application, shown my improved bait in the form of a fish, it will be apparent that the mechanism which constitutes the essential feature of my invention, may be readily adapted to other shapes or forms suitable for fish bait.

The primary purpose of my invention is to produce a weedless bait that will truly simulate a live bait and at the same time prove effective as a means of hooking the fish, the hooks or barbs being entirely concealed within the body of the bait until the fish has taken it into its mouth.

Having this and other objects of general utility in view, I have invented the bait device shown in the accompanying drawing, in which:—

Figure 1 is a view in side elevation of a bait constructed according to my invention; Fig. 2 is a longitudinal section through the device; Fig. 3 is a transverse section on a median line.

Referring to the details of the drawing, 5 represents the outer shell plates or walls of the bait which are made from thin metal cut and bent or stamped to the contour of an ordinary fish and embossed or otherwise made to look like a fish, with head and tail portions, and fins applied as may be desired, these features depending largely upon the kind of fish it is desired to imitate. There are two of these shell plates and they may be secured together by engaging flanges 6 near the tail and by a rivet $8^b$ through the head, the ends of the rivet representing the fish's eyes, or in any other approved mechanical manner, either permanently or detachably. Between the two sides 5, is inserted the part in which is carried the movable and snaring portions of the bait. This part is composed of two flat plates 7 of thin metal slightly spaced apart and secured together by a band 8 which extends around the edges of the plates 7, except at the points $8^a$ and 19. Rivets 12 and 17 also serve to tie the plates together. A double barb hook 10 formed with an eye 11 and barbs 9, is pivotally mounted on the rivet 12, with the front barb pointing rearwardly and the rear barb forwardly, (as clearly shown in Fig. 2), and in such position that the movement of the hook on its pivot will project or retract both barbed portions of the hook. The barbs are normally held in retracted position by the flat spring 13 which at its forward portion 14 is rigidly secured to the plates 7, and its forward end is formed into an eye 15 at which the fish line will be attached. The free end of the spring is curved downward and bears with slight tension against the under side of the hook 10 at a point rearwardly of the pivot 12, thus supporting the hook normally in a retracted position whereby its barbs are concealed between the plates 7 and within the apertures $8^a$.

Mounted on the rivet 17, is a lever element 16 which is made to represent the dorsal fin of a fish, and is so arranged as to occupy the opening 19, and slide freely between the plates 7. This lever is formed with a downwardly extending arm 18 which rests upon the upper side of the hook at a point in the rear of the pivot 12.

In the upper portion of the side or shell members, air cells are formed, and in the lower portion, weights 21 are secured, thus maintaining a proper equilibrium, so that the bait will float in a true life-like position. The air cells are formed by inserting curved plates 20 between the side-walls 7 and the sides 5 and securing the edges so that no water can enter these portions of the bait. The manner of providing these cells is however a matter of mechanical detail that may be effected in various ways.

A bait constructed substantially as indicated, upon being attached to a fishing line and trolled or cast in the usual manner, will maintain a life-like attitude in the water, and, upon being grasped by the jaws of a fish approaching either from the rear or the front end of the bait, the lever 16 will be depressed by the upper jaw of the fish, thus forcing outwardly through the apertures $8^a$, the barbs 9, one of which will enter the upper jaw and the other the lower jaw of the fish.

It will be apparent that the barb on the forward portion of the hook may be dispensed with and only the rear barb used.

Having thus described my invention what I claim is:—

1. A fish bait consisting of a suitable shell in imitation of a live bait and having openings therein, a hook normally concealed and pivoted within said shell, and means for projecting said hook beyond the openings in the shell, said means adapted to be operated by the grasping of the latter by a fish and forming a part of the imitation of the live bait.

2. A fish bait consisting of a suitable shell having openings therein, a hook normally concealed within said shell, a spring supporting said hook in its concealed position and adapted to retract the hook, and means for projecting the hook beyond the openings in the shell, said means adapted to be operated by the grasping of the latter by a fish.

3. A fish bait consisting of a suitable shell, having openings therein, a hook pivoted in the shell and normally concealed therein, a spring supporting the hook in its concealed position, and a lever adapted to project the hook beyond the openings in the shell, through the grasping of the latter by a fish.

4. A fish-bait consisting of a suitable shell, having openings therein, a double barb hook pivotally mounted in the shell and normally concealed therein, means for supporting said hook in its concealed position, and means for simultaneously projecting both barbs, through the openings in the shell, said means adapted to operate through the grasping of the bait by a fish.

5. A fish-bait consisting of a metal shell formed in two parts having air chambers therein, hooking means mounted between said shells, said hooking means comprising a hook normally concealed and adapted to be projected through the action of a fish in grasping the bait.

6. A fish-bait comprising a shell in imitation of a live bait, a hook mounted in said shell and having its barb normally concealed therein, and means adapted to project said barb, said means forming a feature of the imitation of the live bait.

7. A fish-bait comprising a shell having air chambers in its upper portion and weights in its lower portion, plates mounted between said chambers and weights, a hook pivoted between said plates and having its barb normally concealed within said shell, and means for projecting the hook beyond the shell, said means adapted to be operated by the fish grasping the bait.

In testimony whereof I affix my signature in the presence of two witnesses.

JOSEPH B. FISCHER.

Witnesses:
F. BENJAMIN,
M. A. MILORD.